(12) United States Patent
Kuo et al.

(10) Patent No.: US 8,044,603 B2
(45) Date of Patent: Oct. 25, 2011

(54) LIGHT EMITTING DIODE DRIVING DEVICE AND LIGHT SYSTEM

(75) Inventors: Hung-Chih Kuo, Junghe (TW);
Huang-Chen Guo, Junghe (TW);
Wen-Chang Hsiao, Junghe (TW)

(73) Assignee: UPEC Electronics Corp. (TW)

( * ) Notice: Subject to any disclaimer, the term of this patent is extended or adjusted under 35 U.S.C. 154(b) by 467 days.

(21) Appl. No.: 12/392,434

(22) Filed: Feb. 25, 2009

(65) Prior Publication Data

US 2009/0153062 A1 Jun. 18, 2009

(30) Foreign Application Priority Data

Sep. 12, 2008 (TW) ................. 97135124 A

(51) Int. Cl.
*H05B 37/02* (2006.01)

(52) U.S. Cl. ......... 315/224; 315/287; 315/307; 315/360

(58) Field of Classification Search ............. 315/209 R, 315/224, 246, 287, 291, 307, 308, 360
See application file for complete search history.

(56) References Cited

U.S. PATENT DOCUMENTS

| | | | |
|---|---|---|---|
| 6,940,733 B2 * | 9/2005 | Schie et al. ............... | 363/21.12 |
| 7,863,833 B2 * | 1/2011 | Tamegai et al. ............ | 315/307 |
| 2008/0074058 A1 * | 3/2008 | Lee et al. ................. | 315/291 |
| 2010/0026208 A1 * | 2/2010 | Shteynberg et al. ....... | 315/297 |

* cited by examiner

*Primary Examiner* — Thuy Vinh Tran
(74) *Attorney, Agent, or Firm* — Baker & McKenzie LLP

(57) ABSTRACT

A light emitting diode driving device and light system are provided. The light emitting diode driving device drives a light source by a received alternating current voltage. The light emitting diode driving device includes a rectifier, a feedback unit, a protection unit, a switch unit, a timing unit, and a control unit. The rectifier is electrically coupled to an alternating current voltage source and the light source for providing the alternating current voltage to the light source. The feedback unit is used to detect a loading state and generate a feedback signal according the loading state for outputting the feedback signal. The protection unit is used to receive the feedback signal and compare the feedback signal with a reference voltage built in the protection unit for outputting a switch signal. The switch unit is used to receive the switch signal and connect or disconnect the alternating current voltage source and the light source. Therefore, the protection unit can avoid a burnout due to an exceeding current of the light source.

43 Claims, 8 Drawing Sheets

LIGHT EMITTING DIODE DRIVING DEVICE AND LIGHT SYSTEM

CROSS-REFERENCES TO RELATED APPLICATION

The present application claims priority under 35 U.S.C. 119(a) to Taiwanese application number 097135124 filed on Sep. 12, 2008 which is incorporated herein by reference in its entirety as if set forth in full.

FIELD OF THE INVENTION

This invention relates generally to a light emitting diode driving device; more particularly, this invention relates to a light emitting diode driving device and a lighting system with a protection unit to avoid a burnout of the light source.

BACKGROUND OF THE INVENTION

The light emitting diode (called LED) was invented in 1960. The LED was commercialized until 1998 from the red light LED, the green light LED and the blue light LED. The LED has functions of less power consumption and fast switch. The LED is applied in indicating area, for example, the traffic signal and the flat-panel display. The LED is applied in a new area after the LED is being a backlight in high-level cellphone.

Presently, the LED is applied in many areas, for example, the remote control, the motor vehicle, the lighting system, and the outdoor large display etc. Besides, the LED is being a potential product of the display due to its high color saturation, fast switch, no mercury and long life so that the LED can be applied in the display light source and the back light.

Please prefer to FIG. 4, it is a schematic block diagram showing a circuit of a conventional lighting system. The lighting system 400 comprises a driving device 406 and a light source 408. The lighting system 400 receives an alternating current voltage supplied by the alternating current voltage source 402 through the rectifier 404. The driving device 406 comprises a switch unit 412, a feedback unit 416, a control unit 418, a timing synchronous unit 420 and an illumination control device 422.

The timing synchronous unit 420 transfers the alternating current voltage into a timing synchronous signal. The control unit 418 is electrically coupled to the timing synchronous unit 420 for outputting an adjustment signal to the switch unit 412 according to a timing of the timing synchronous signal. The switch unit 412 is electrically coupled between the rectifier 404 and the light source 408. The switch unit 412 decides to supply the alternating current voltage to the light source 408 or not according to a state (i.e. high logic level or low logic level) of the adjustment signal when the switch unit 412 receives the adjustment signal. Therefore, the light source 408 will be enabled. The feedback unit 416 is electrically coupled between the light source 408 and the control unit 418 for detecting a loading state (for example, a current value of the light source 408) of the light source 408 and outputting a feedback signal to the control unit 418 according to detecting result.

A predetermined illumination value is obtained from the illumination control device 422 after the feedback signal is received by the control unit 418. Users according to the user's requirement can adjust the predetermined illumination value. Then, the control unit 418 compares the feedback signal with the predetermined illumination value for reference of width of the adjustment signal.

SUMMARY OF THE INVENTION

The present invention is directed to a light emitting diode driving device and a lighting system. According to one embodiment of this invention, a connection between the light source and the alternating current voltage source can be disconnected or connected according to a loading state of the light source.

The present invention is directed to a light emitting diode driving device and a lighting system. According to one embodiment of this invention, a connection between the light source and the alternating current voltage source can be disconnected or connected according to a loading state of the light source and a present illumination.

The present invention provides a light emitting diode driving device. The light emitting diode driving device is electrically coupled to an alternating current voltage source and a light source. The alternating current voltage source outputs the alternating current voltage. The light emitting diode driving device comprises a rectifier, a feedback unit, a protection unit, a switch unit, a timing unit and a control unit. The rectifier electrically coupled to the alternating current voltage source and the light source supplies the alternating current voltage to the light source. The feedback unit electrically coupled to the light source detects a loading state of the light source for generating a feedback signal according to the loading state. The protection unit electrically coupled to the feedback unit receives the feedback signal for comparing the feedback signal with a reference voltage built in the protection unit and outputting a switch signal. The switch unit has a first terminal, a second terminal and a third terminal. The first terminal of the switch unit is electrically coupled to the alternating current voltage source. The second terminal of the switch unit is electrically coupled to the light source. The third terminal of the switch unit is electrically coupled to the protection unit for receiving the switch signal to connect or disconnect between the alternating current voltage source and the light source according to the switch signal. The timing unit electrically coupled to the alternating current voltage source fetches the alternating current voltage and performs a synchronous operation with the alternating current voltage for outputting a timing synchronous signal. The control unit electrically coupled to the timing unit and the protection unit receives the timing synchronous signal and performs a modulation operation with the timing synchronous signal for outputting a timing modulation signal.

According to an embodiment of the present invention, the protection unit receives a reference voltage and the feedback signal. The protection unit comprises a comparator, a first transistor and a first resistor. The comparator has a first input terminal, a second input terminal and an output terminal. The first input terminal of the comparator receives the feedback signal. The second input terminal of the comparator receives the reference voltage. The first resistor has a first terminal and a second terminal. The first terminal of the first resistor receives a first control signal. The first transistor has an emitter terminal, a base terminal and a collector terminal. The collector terminal of the first transistor is electrically coupled to the second terminal of the first resistor. The base terminal of the first transistor is electrically coupled to the output terminal of the comparator. The emitter terminal of the first transistor is electrically coupled to ground.

The present invention also provides a light emitting diode driving device. The light emitting diode driving device is electrically coupled to an alternating current voltage source and a light source. The alternating current voltage source outputs an alternating current voltage. The light emitting diode driving device comprises a rectifier, a feedback unit, a protection unit and a switch unit. The rectifier electrically coupled to the alternating current voltage source and the light source supplies the alternating current voltage to the light source. The feedback unit electrically coupled to the light source detects a loading state of the light source for generating a feedback signal according to the loading state. The protection unit electrically coupled to the feedback unit receives the feedback signal for comparing the feedback signal with a reference voltage built in the protection unit and outputting a switch signal. The switch unit has a first terminal, a second terminal and a third terminal. The first terminal of the switch unit is electrically coupled to the alternating current voltage source. The second terminal of the switch unit is electrically coupled to the light source. The third terminal of the switch unit is electrically coupled to the protection unit for receiving the switch signal to connect or disconnect between the alternating current voltage source and the light source according to the switch signal.

The present invention also provides a light emitting diode driving device. The light emitting diode driving device is electrically coupled to an alternating current voltage source and a light source. The alternating current voltage source outputs an alternating current voltage. The light emitting diode driving device comprises a rectifier, a feedback unit, a control unit, a protection unit and a switch unit. The rectifier electrically coupled to the alternating current voltage source and the light source supplies the alternating current voltage to the light source. The feedback unit electrically coupled to the light source detects a loading state of the light source for generating a feedback signal according to the loading state. The control unit electrically coupled to the feedback unit receives and outputs the feedback signal. The control unit compares the feedback signal with a predetermined illumination for generating a first comparing result. The protection unit electrically coupled to the control unit receives the feedback signal and the first comparing result. The protection unit compares the feedback signal with a reference voltage for generating a second comparing result. The protection unit generates and outputs a switch signal according to the first and the second comparing result. The switch unit has a first terminal, a second terminal and a third terminal. The first terminal of the switch unit is electrically coupled to the alternating current voltage source. The second terminal of the switch unit is electrically coupled to the light source. The third terminal of the switch unit is electrically coupled to the protection unit for receiving the switch signal to connect or disconnect between the alternating current voltage source and the light source according to the switch signal.

The present invention also provides a lighting system. The lighting system is electrically coupled to the alternating current voltage source. The alternating current voltage source outputs an alternating current voltage. The lighting system comprises a light source and a light emitting diode driving device. The light source electrically coupled to the alternating current voltage source receives the alternating current voltage. The light emitting diode driving device is electrically coupled to the alternating current voltage source and the light source. The light emitting diode driving device comprises a rectifier, a feedback unit, a protection unit and a switch unit. The rectifier electrically coupled to the alternating current voltage source and the light source supplies the alternating current voltage to the light source. The feedback unit electrically coupled to the light source detects a loading state of the light source for generating a feedback signal according to the loading state. The protection unit electrically coupled to the feedback unit receives the feedback signal for comparing the feedback signal with a reference voltage built in the protection unit and outputting a switch signal. The switch unit has a first terminal, a second terminal and a third terminal. The first terminal of the switch unit is electrically coupled to the alternating current voltage source. The second terminal of the switch unit is electrically coupled to the light source. The third terminal of the switch unit is electrically coupled to the protection unit for receiving the switch signal to connect or disconnect between the alternating current voltage source and the light source according to the switch signal.

Other features and advantages of the invention will become apparent from a review of the ensuing description, in conjunction with the drawings.

DESCRIPTION OF EMBODIMENTS OF THE INVENTION

Figure 1A:
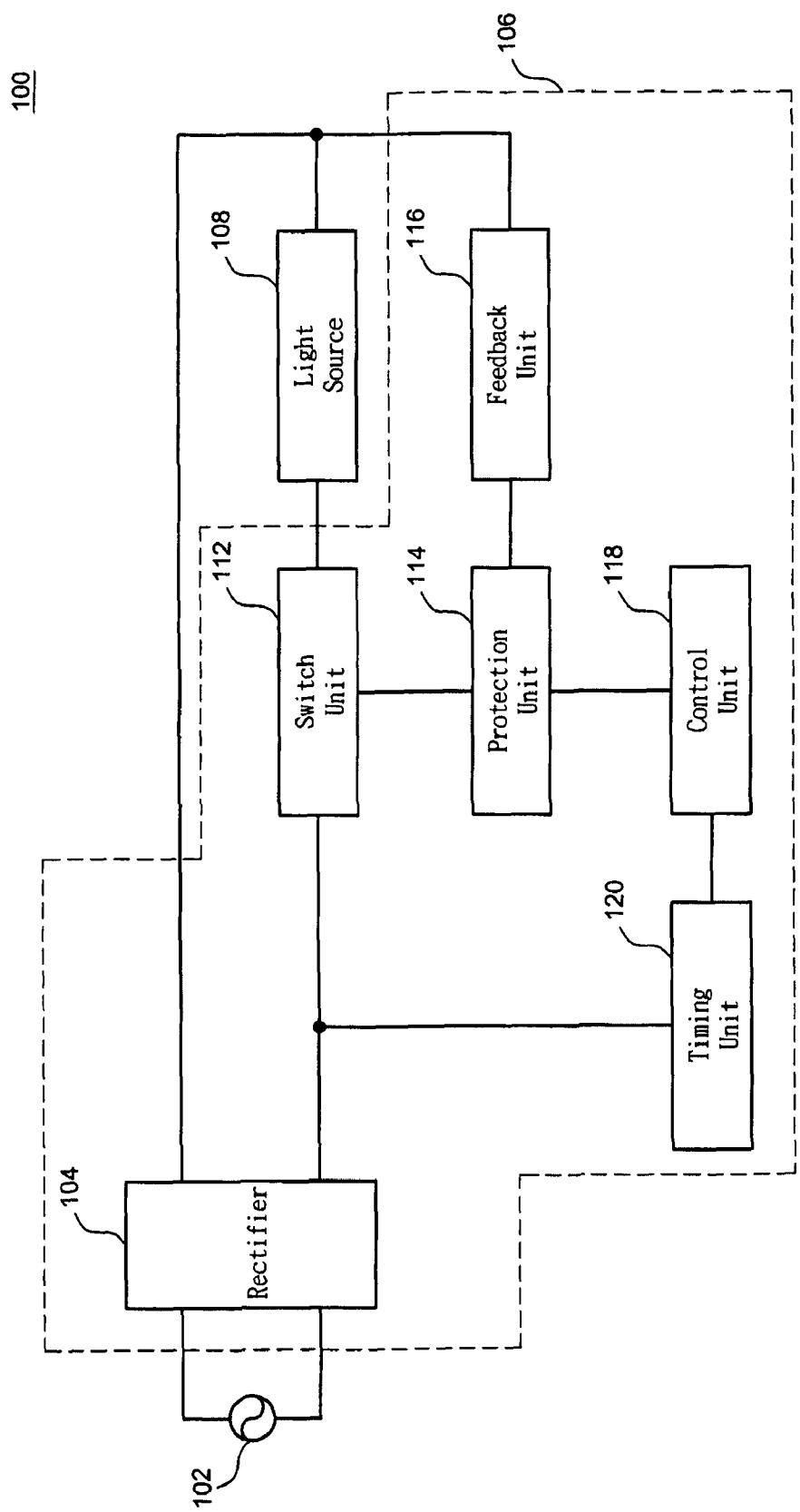
FIG. 1A is a schematic block diagram showing a lighting system according to an embodiment of the present invention.

FIG. 1A is a schematic block diagram showing a lighting system according to an embodiment of the present invention. The lighting system 100 comprises a light emitting diode driving device 106 and a light source 108.

In an embodiment of the present invention, for example, the light source 108 can be a light emitting diode array or a single light emitting diode. The number of the light emitting diode is not limited thereto in the present invention. Besides, the light emitting diode can be driven by direct voltage (DC) or alternating current voltage (AC). The present invention, however, are not limited thereto.

The light emitting diode driving device 106 comprises a rectifier 104, a switch unit 112, a protection unit 114, a feedback unit 116, a control unit 118 and a timing unit 120. In this embodiment, the feedback unit 116 is electrically coupled to the light source 108 and the protection unit 114 for detecting a loading state of the light source 108 and generating a feedback signal according to the loading state of the light source 108. Then, the feedback unit 116 outputs the feedback signal. Wherein, the feedback signal can be a current value flowing through the light source 108.

Wherein, the rectifier 104 is electrically coupled to the alternating current voltage source 102 for receiving an alternating current voltage. Therefore, the rectifier 104 outputs the alternating current voltage after rectifying. One of ordinary skill in the art should know that the rectifier 104 can be disposed at the inside of the light emitting diode driving device 106 or at the outside of the light emitting diode driving device 106. The position of the rectifier 104 is decided by design requirement.

The protection unit 114 receives the feedback signal from the feedback unit 116 and compares the feedback signal with a reference voltage built in the protection unit 114. Then, the protection unit 114 outputs a switch signal to the switch unit 112 according to the comparing result. If the feedback signal (for example, it can be low logic level or high logic level) indicating a current value is greater than the reference voltage, an electrically connection between the alternating current voltage source 102 and the light source 108 should be disconnected. If the feedback signal (for example, it can be low logic level or high logic level) indicating a current value is smaller than the reference voltage, an electrically connection between the alternating current voltage source 102 and the light source 108 should be connected.

The switch unit 112 has a first terminal, a second terminal and a third terminal. The first terminal of the switch unit 112 is electrically coupled to the alternating current voltage source 102 (through the rectifier 104). The second terminal of the switch unit 112 is electrically coupled to the light source 108. The third terminal of the switch unit 112 is electrically coupled to the protection unit 114 for receiving the switch signal. Then, the switch unit 112 connects or disconnects between the alternating current voltage source 102 and the light source 108.

The timing unit 120 is electrically coupled to the alternating current voltage source 102 (through the rectifier 104) for fetching the alternating current voltage outputted by the rectifier 104 according to a predetermined cycle. Secondly, the timing unit 120 performs a synchronous operation with the alternating current voltage for generating and outputting a timing synchronous signal. Wherein, a duty cycle of the light source 108 and a cycle of the alternating current voltage can be matched by the timing synchronous signal.

The control unit 118 is electrically coupled to the timing unit 120 and the protection unit 114 for receiving the timing synchronous signal. Then, the control unit 118 performs a modulation operation with the timing synchronous signal for outputting a timing modulation signal.

Wherein, when the switch unit 112 receives the timing modulation signal and decides a timing which disconnecting the electrically connection between the rectifier 104 and the light source 108 according to a level of the timing modulation signal so that a pulse width of the alternating current voltage supplied to the light source 108 can be modulated.

The rectifier 104 outputs the alternating current voltage supplied from the alternating current voltage source 102 after performing voltage modulation and filter so that the light source 108 can work more stable. Wherein, the rectifier 104 can be a bridge rectifier. The present invention, however, is not limited thereto.

Please refer to FIG. 1A, the operation method of the lighting system is that the rectifier 104 receives the alternating current voltage supplied by the alternating current voltage source 102. The rectifier 104 outputs the alternating current voltage after filtering and rectifying. If an electrically connection between the light source 108 and the alternating current voltage source 102 is connected by the switch unit 112 (through the rectifier 104), the alternating current voltage source 102—the rectifier 104—the switch unit 112—the light source 108—the rectifier 104—the alternating current voltage source 102 will be become a loop. Therefore, the light source 108 will be enabled if the alternating current voltage can drive the light source 108.

In the meantime, the feedback unit 116 can detect a feedback current value of the light source 108 after the light source 108 is driven. Then, the feedback unit 116 outputs a feedback signal corresponding to the feedback current value to the protection unit 114. The control unit 118 compares the feedback signal with the reference voltage built in the protection unit 114 for outputting a switch signal to the switch unit 112. Then, the switch unit 112 decides to disconnect the loop between the light source 108 and the alternating current voltage source 102 according to the switch signal. Besides, the timing unit 120 fetches the alternating current voltage outputted by the rectifier 104 for performing the synchronous operation to output the timing synchronous signal to the control unit 118. The control unit 118 performs a modulation operation according to the timing synchronous signal and controls switch-on and switch-off of the switch unit 112 through the protection unit 114 for modulating a pulse width of the alternating current voltage supplied to the light source 108.

Figure 1B:
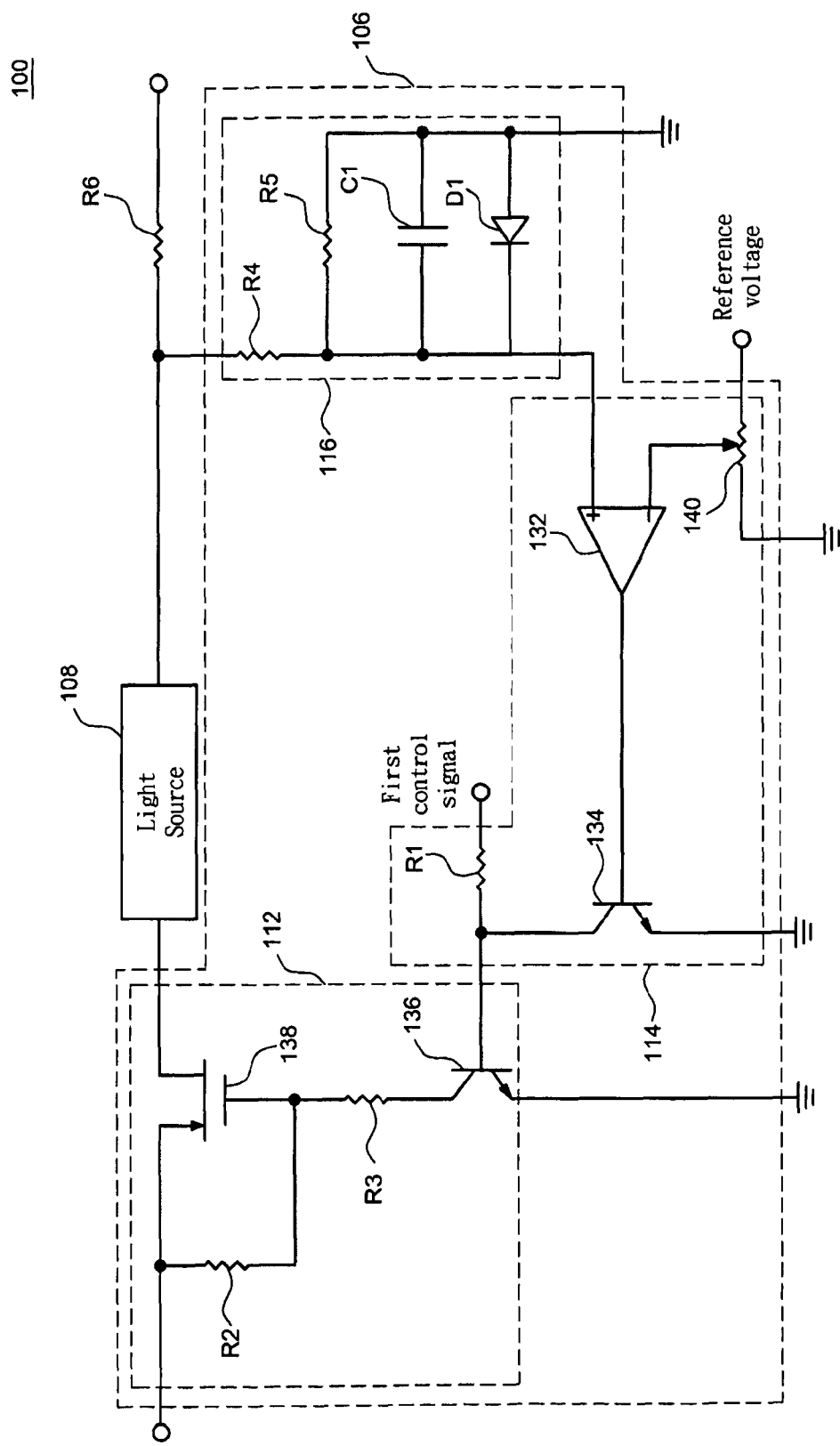
FIG. 1B is a detail circuit showing a part of the lighting system according to an embodiment of the present invention.

FIG. 1B is a detail circuit showing a part of the lighting system according to an embodiment of the present invention. In the present invention, the sixth resistor R6 has a first terminal and a second terminal. The first terminal of the sixth resistor R6 is electrically coupled to the light source 108 and the second terminal of the sixth resistor R6 is electrically coupled to rectifier 104.

The feedback unit 116 comprises a fourth resistor R4, a fifth resistor R5, a capacitor C1 and a diode D1. The fourth resistor R4 has a first terminal and a second terminal. The first terminal of the fourth resistor R4 is electrically coupled to the light source 108. The second terminal of the fourth resistor R4 is electrically coupled to a first input terminal of a comparator 132 of the protection unit 114.

The fifth resistor R5 has a first terminal and a second terminal. The first terminal of the fifth resistor R5 is electrically coupled to the second terminal of the fourth resistor R4 and the second terminal of the fifth resistor R5 is electrically coupled to ground.

The capacitor C1 has a first terminal and a second terminal. The first terminal of the capacitor C1 is electrically coupled to the second terminal of the fourth resistor R4. The second terminal of the capacitor C1 is electrically coupled to ground.

The diode D1 has a first terminal and a second terminal. The first terminal of the diode D1 is electrically coupled to the second terminal of the fourth resistor R4. The second terminal of the diode D1 is electrically coupled to ground.

Wherein, the alternating current voltage is delivered from the second terminal of the fourth resistor R4 to the first input terminal of the comparator 132 of the protection unit 114 after the alternating current voltage flowed the fourth resistor R4.

The protection unit 114 receives the reference voltage, the first control signal and the feedback signal. The protection unit 114 comprises the comparator 132, a first transistor 134, a first resistor R1 and a variable resistor 140. Wherein, the comparator 132 has a first input terminal, a second input terminal and an output terminal. The first input terminal of the comparator 132 is electrically coupled to the second terminal of the fourth resistor R4 of the feedback unit 116 for receiving the feedback signal. The second input terminal of the comparator 132 receives a reference voltage. The comparator 132 compares the reference voltage with the feedback signal for outputting a comparing signal to the first transistor 134 according to a comparing result. One of ordinary skill in the art should know that the reference voltage can be supplied by a reference voltage source and the reference voltage is equal to the reference voltage as above-mentioned.

The variable resistor 140 is electrically coupled between the second input terminal of the comparator 132 and the reference voltage source. Wherein, user according to operation requirement can adjust the variable resistor 140. Certainly, the magnitude of the alternating current voltage influenced by an adjustable range of the variable resistor 140 should be accepted by the light source 108.

The first transistor 134 has an emitter terminal, a base terminal and a collector terminal. The base terminal of the first transistor 134 is electrically coupled to the output terminal of the comparator 132. The emitter terminal of the first transistor 134 is electrically coupled to ground. The collector terminal of the first transistor 134 is electrically coupled to the switch unit 112.

The first resistor R1 has a first terminal and a second terminal. The first terminal of the first resistor R1 receives the first control signal. The second terminal of the first resistor R1 is electrically coupled to the collector terminal of the first transistor 134 and the base terminal of the third transistor 136.

Wherein, the first transistor 134 determines turn-on or turn-off according to the comparing signal outputted by the comparator 132 for deciding a potential of the collector terminal of the first transistor 134.

In an embodiment of the present invention, the first transistor 134 can be a bipolar transistor. The present invention, however, are not limited thereto. The first control signal can be the control signal delivered by the control unit 118.

Please prefer to FIG. 1B, the switch unit 112 receives the first control signal. The switch unit 112 comprises a second transistor 138, a second resistor R2, a third resistor R3, a third transistor 136 resistor. The second transistor 138 has a drain terminal, a gate terminal and a source terminal. The drain terminal of the second transistor 138 is electrically coupled to the light source 108. The source terminal of the second transistor 138 is electrically coupled to the alternating current voltage source 102 (through the rectifier 104).

In the present invention, the second resistor R2 has a first terminal and a second terminal. The first terminal of the second resistor R2 is electrically coupled to the gate terminal of the second transistor 138. The second terminal of the second resistor R2 is electrically coupled to the source terminal of the second transistor 138. The third resistor R3 has a first terminal and a second terminal. The first terminal of the third resistor R3 is electrically coupled to the gate terminal of the second transistor 138. The second terminal of the third resistor R3 is electrically coupled to the collector terminal of the third transistor 136.

The third transistor 136 has an emitter terminal, a base terminal and a collector terminal. The emitter terminal of the third transistor 136 is electrically coupled to ground. Wherein, the third transistor 136 determines turn-on or turn-off according to the potential of the collector terminal of the first transistor 134. In another word, the potential of the collector terminal of the first transistor 134 is decided by the first control signal when the first transistor 134 is not turned on. On the other hand, the collector terminal of the first transistor 134 is low logic level when the first transistor 134 is turned on. Secondly, the second transistor 138 determines turn-on or turn-off according to the potential of the collector terminal of the third transistor 136.

In an embodiment of the present invention, the third transistor 136 can be a bipolar transistor. The second transistor 138 can be a P-type semiconductor. The present invention, however, are not limited thereto.

Figure 2:
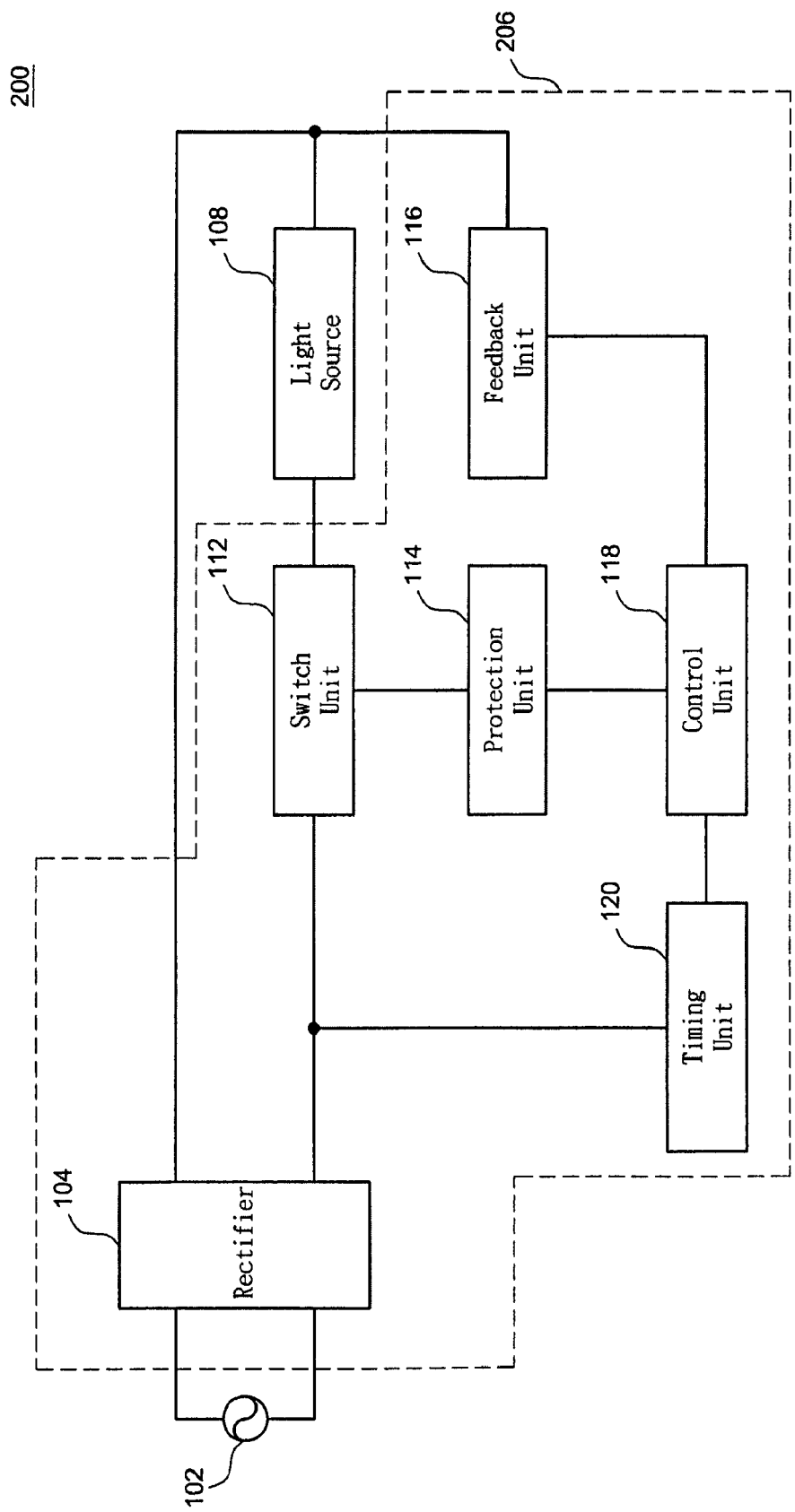
FIG. 2 is a schematic block diagram showing a part of the lighting system according to another embodiment of the present invention.

FIG. 2 is a schematic block diagram showing a part of the lighting system according to another embodiment of the present invention. The difference between FIG. 1A and FIG. 2 is that the feedback unit 116 of FIG. 2 is electrically coupled to the control unit 118 and the light source 108. The lighting system 200 comprises a light emitting diode driving device 206 and a light source 108.

In an embodiment of the present invention, the light source 108 can be a light emitting diode array or a single light emitting diode. The present invention, however, are not limited thereto.

The light emitting diode driving device 206 comprises a rectifier 104, a switch unit 112, a protection unit 114, a feedback unit 116, a control unit 118 and a timing unit 120. In the present invention, the feedback unit 116 is electrically coupled to the light source 108 and the control unit 118 for detecting a loading state of the light source 108 and generating a feedback signal according to the loading state of the light source 108.

Wherein, the rectifier 104 is electrically coupled to an alternating current voltage source 102 for receiving an alternating current voltage. Therefore, the rectifier 104 outputs the alternating current voltage after rectifying. One of ordinary skill in the art should know that the rectifier 104 can be disposed at the inside of the lighting system 200 or at the outside of the lighting system 200. The position of the rectifier 104 is decided by design requirement.

The timing unit 120 is electrically coupled to the alternating current voltage source 102 (through the rectifier 104) for fetching the alternating current voltage outputted by the rectifier 104 according to a predetermined cycle. Secondly, the timing unit 120 performs a synchronous operation with the alternating current voltage for generating and outputting a timing synchronous signal. Wherein, a duty cycle of the light source 108 and a cycle of the alternating current voltage can be matched by the timing synchronous signal.

The control unit 118 is electrically coupled to the timing unit 120 and the feedback unit 116. The control unit 118 receives the feedback signal delivered by the feedback unit 116 for receiving and outputting the output feedback signal. Wherein, the control unit 118 compares the feedback signal with a predetermined illumination value for obtaining a first comparing result. One of ordinary skill in the art should know that the predetermined illumination value can be built in the memory within the control unit 118 or connected to the control unit 118.

Besides, the control unit 118 performs a modulation operation with the timing synchronous signal delivered by the timing unit 120 for outputting a timing modulation signal through the protection unit 114.

The protection unit 114 is electrically coupled to the control unit 118 for receiving the feedback signal. The protection unit 114 compares the feedback signal with a reference voltage built in the protection unit 114 for obtaining a second comparing result. Then, the protection unit 114 outputs a switch signal to the switch unit 112 according to the second comparing result. If the feedback signal (for example, it can be low logic level or high logic level) indicating a current value is greater than the reference voltage, an electrically connection between the alternating current voltage source 102 and the light source 108 should be disconnected. If the feedback signal (for example, it can be low logic level or high logic level) indicating a current value is smaller than the reference voltage, an electrically connection between the alternating current voltage source 102 and the light source 108 should be connected.

In an embodiment of the present invention, a pulse width of the alternating current voltage should be narrowed down if the feedback signal is greater than the predetermined illumination value. A pulse width of the alternating current voltage should be enlarged if the feedback signal is smaller than the predetermined illumination value.

The switch unit 112 has a first terminal, a second terminal and a third terminal. The first terminal of the switch unit 112 is electrically coupled to the alternating current voltage source 102 (through the rectifier 104). The second terminal of the switch unit 112 is electrically coupled to the light source 108. The third terminal of the switch unit 112 is electrically coupled to the protection unit 114 for receiving the switch signal. Then, the switch unit 112 connects or disconnects between the alternating current voltage source 102 and the light source 108.

Wherein, when the switch unit 112 receives the timing modulation signal, the switch unit 112 decides a timing disconnecting the electrically connection between the rectifier 104 and the light source 108 according to a level of the timing modulation signal so that a pulse width of the alternating current voltage supplied to the light source 108 can be modulated.

In an embodiment of the present invention, an on-off cycle of the switch unit 112 is modulated by the switch signal of the protection unit 114 when one of the first comparing result and the second comparing result indicates that the on-off cycle of the switch unit 112 should be modulated.

The rectifier 104 outputs the alternating current voltage supplied from the alternating current voltage source 102 after performing voltage modulation and filter so that the light source 108 can work more stable. Wherein, the rectifier 104 can be a bridge rectifier. The present invention, however, is not limited thereto.

Please prefer to FIG. 2A, the operation method of the lighting system is that the rectifier 104 receives the alternating current voltage supplied by the alternating current voltage source 102. The rectifier 104 outputs the alternating current voltage after filtering and rectifying. If an electrically connection between the light source 108 and the alternating current voltage source 102 is connected by the switch unit 112 (through the rectifier 104), the alternating current voltage source 102—the rectifier 104—the switch unit 112—the light source 108—the rectifier 104—the alternating current voltage source 102 will be become a loop. Therefore, the light source 108 will be enabled if the alternating current voltage can drive the light source 108.

In the meantime, the feedback unit 116 can detect a feedback current value of the light source 108 after the light source 108 is driven. Then, the feedback unit 116 outputs a feedback signal corresponding to the feedback current value to the protection unit 114. The control unit 118 compares the feedback signal with the reference voltage built in the protection unit 114 for outputting a switch signal to the switch unit 112. Then, the switch unit 112 decides to disconnect the loop between the light source 108 and the alternating current voltage source 102 according to the switch signal. Besides, the timing unit 120 fetches the alternating current voltage outputted by the rectifier 104 for performing the synchronous operation to output the timing synchronous signal to the control unit 118. The control unit 118 performs a modulation operation according to the timing synchronous signal and controls switch-on and switch-off of the switch unit 112 through the protection unit 114 for modulating a pulse width of the alternating current voltage supplied to the light source 108.

In an embodiment of the present invention, the detail circuit of FIG. 2 is similar to the FIG. 1Bs. Therefore, no more will be described here.

Figure 3A:
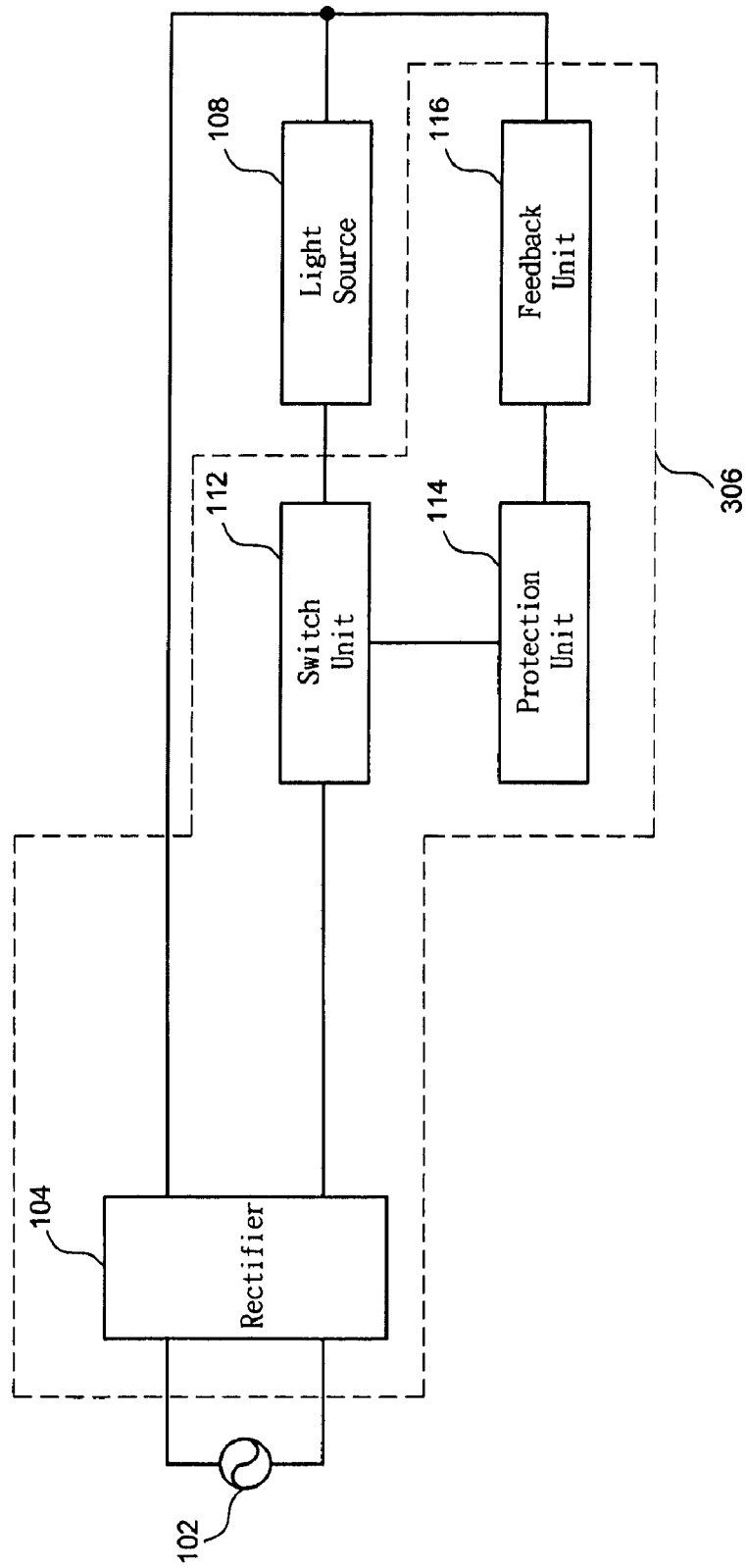
FIG. 3A is a schematic block diagram showing a part of the lighting system according to another embodiment of the present invention.

Please prefer to FIG. 3A, it is a schematic block diagram showing a part of the lighting system according to another embodiment of the present invention. The difference between FIG. 1A and FIG. 3 is that the control unit 118 and the timing unit 120 are not included within the FIG. 3. The lighting system 300 comprises a light emitting diode driving device 306 and a light source 108.

In an embodiment of the present invention, the light source 108 can be a light emitting diode array or a single light emitting diode. The present invention, however, are not limited thereto.

The light emitting diode driving device 306 comprises a rectifier 104, a switch unit 112, a protection unit 114, and a feedback unit 116. In the present invention, the feedback unit 116 is electrically coupled to the light source 108 and the protection unit 114 for detecting a loading state of the light source 108 and generating a feedback signal according to the loading state of the light source 108. Then, the feedback unit 116 outputs the feedback signal. Wherein, for example, the feedback signal can be a current value flowing through the light source 108.

Wherein, the rectifier 104 is electrically coupled to the alternating current voltage source 102 for receiving an alternating current voltage. Therefore, the rectifier 104 outputs the alternating current voltage after rectifying. One of ordinary skill in the art should know that the rectifier 104 can be disposed at the inside of the light emitting diode driving device 300 or at the outside of the light emitting diode driving device 300. The position of the rectifier 104 is decided by design requirement.

The protection unit 114 receives the feedback signal from the feedback unit 116 and compares the feedback signal with a reference voltage built in the protection unit 114. Then, the protection unit 114 outputs a switch signal to the switch unit 112 according to the comparing result. If the feedback signal (for example, it can be low logic level or high logic level) indicating a current value is greater than the reference voltage, an electrically connection between the alternating current voltage source 102 and the light source 108 should be disconnected. If the feedback signal (for example, it can be low logic level or high logic level) indicating a current value is smaller than the reference voltage, an electrically connection between the alternating current voltage source 102 and the light source 108 should be connected.

The switch unit 112 has a first terminal, a second terminal and a third terminal. The first terminal of the switch unit 112 is electrically coupled to the alternating current voltage source 102 (through the rectifier 104). The second terminal of the switch unit 112 is electrically coupled to the light source 108. The third terminal of the switch unit 112 is electrically coupled to the protection unit 114 for receiving the switch signal. Then, the switch unit 112 connects or disconnects between the alternating current voltage source 102 and the light source 108.

The rectifier 104 outputs the alternating current voltage supplied from the alternating current voltage source 102 after performing voltage modulation and filter so that the light source 108 can work more stable. Wherein, the rectifier 104 can be a bridge rectifier. The present invention, however, is not limited thereto.

Please refer to FIG. 3A, the operation method of the lighting system is that the rectifier 104 receives the alternating current voltage supplied by the alternating current voltage source 102. The rectifier 104 outputs the alternating current voltage after filtering and rectifying. If an electrically connection between the light source 108 and the alternating current voltage source 102 is connected by the switch unit 112 (through the rectifier 104), the alternating current voltage source 102—the rectifier 104—the switch unit 112—the light source 108—the rectifier 104—the alternating current voltage source 102 will be become a loop. Therefore, the light source 108 will be enabled if the alternating current voltage can drive the light source 108.

In the meantime, the feedback unit 116 can detect a feedback current value of the light source 108 after the light source 108 is driven. Then, the feedback unit 116 outputs a feedback signal which corresponding to the feedback current value to the protection unit 114. The control unit 118 compares the feedback signal with the reference voltage built in the protection unit 114 for outputting a switch signal to the switch unit 112. Then, the switch unit 112 decides to disconnect the loop between the light source 108 and the alternating current voltage source 102 according to the switch signal.

Figure 3B:
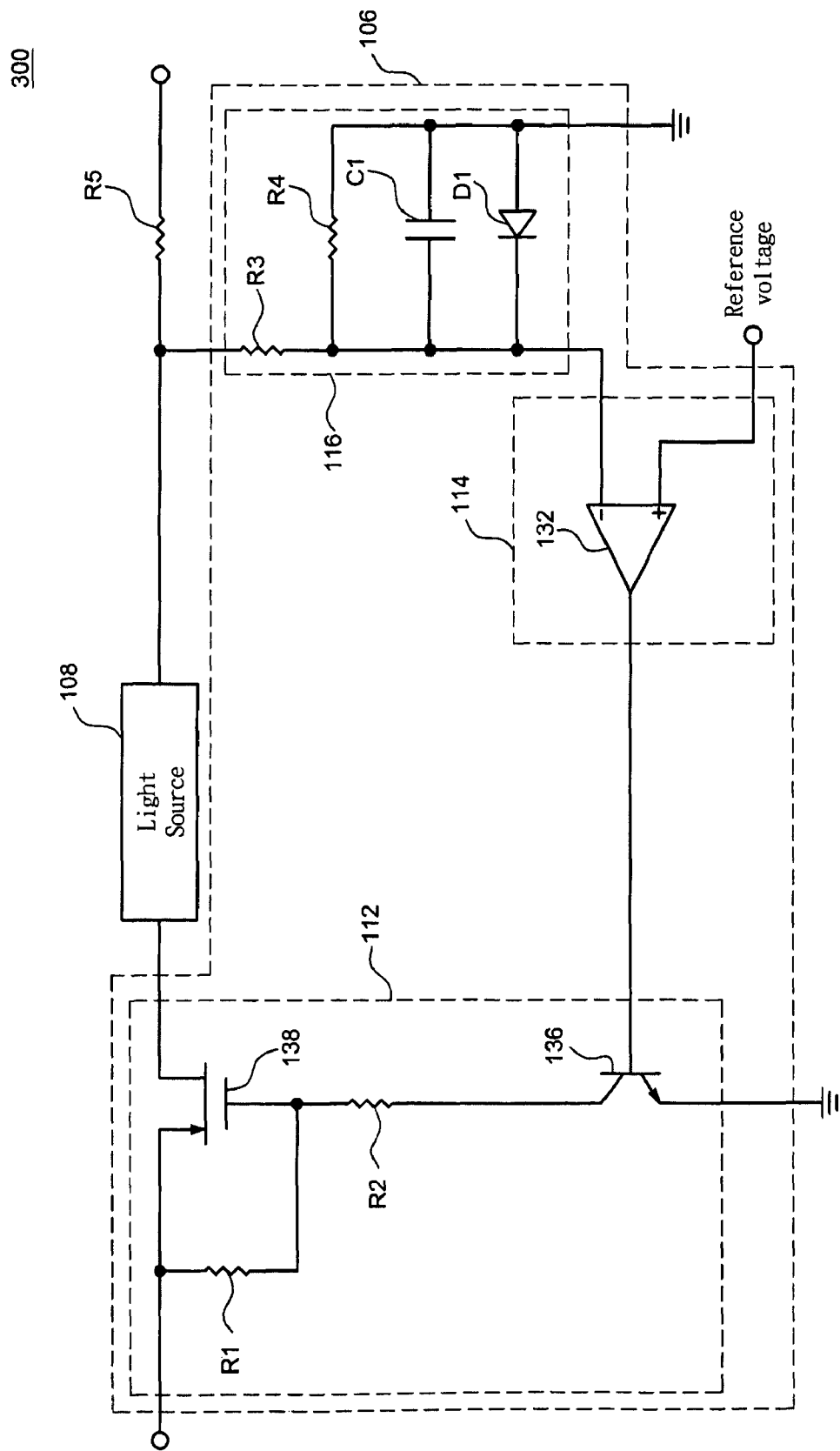
FIG. 3B is a detail circuit showing a part of the lighting system according to another embodiment of the present invention.
Figure 4:
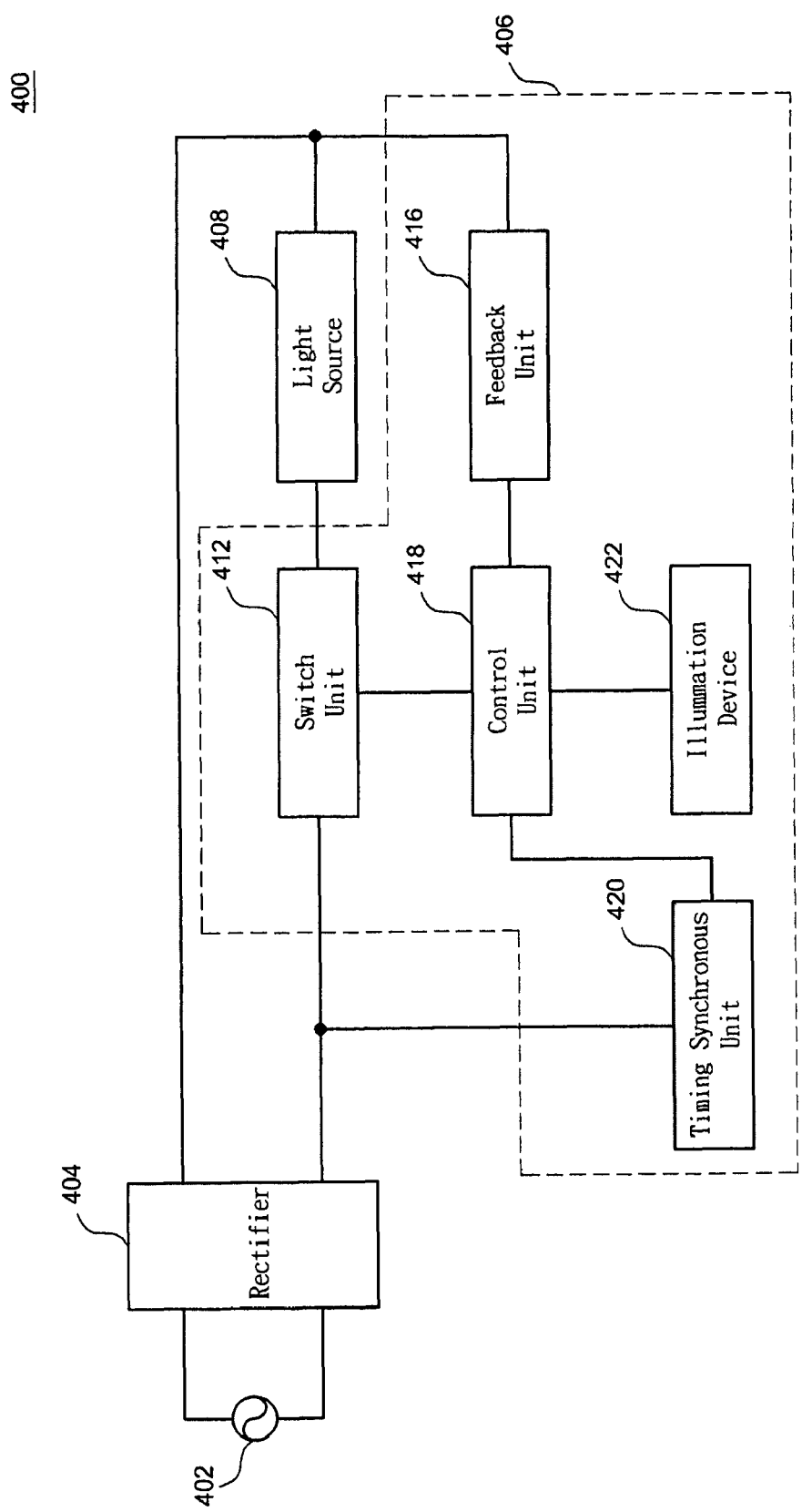
FIG. 4 is a schematic block diagram showing a circuit of a conventional lighting system.

Please refer to FIG. 3B, it is a detail circuit showing a part of the lighting system according to another embodiment of the present invention. In the present invention, the fifth resistor R5 has a first terminal and a second terminal. The first terminal of the fifth resistor R5 is electrically coupled to the light source 108 and the second terminal of the fifth resistor R5 is electrically coupled to rectifier 104.

The feedback unit 116 comprises a third resistor R3, a fourth resistor R4, a capacitor C1 and a diode D1. The third resistor R3 has a first terminal and a second terminal. The first terminal of the third resistor R3 is electrically coupled to the light source 108. The second terminal of the third resistor R3 is electrically coupled to a first input terminal of a comparator 132 of the protection unit 114.

The fourth resistor R4 has a first terminal and a second terminal. The first terminal of the fourth resistor R4 is electrically coupled to the second terminal of the third resistor R3 and the second terminal of the fourth resistor R4 is electrically coupled to ground.

The capacitor C1 has a first terminal and a second terminal. The first terminal of the capacitor C1 is electrically coupled to the second terminal of the third resistor R3. The second terminal of the capacitor C1 is electrically coupled to ground.

The diode D1 has a first terminal and a second terminal. The first terminal of the diode D1 is electrically coupled to the second terminal of the third resistor R3. The second terminal of the diode D1 is electrically coupled to ground.

Wherein, the alternating current voltage is delivered from the second terminal of the third resistor R3 to the first input terminal of the comparator 132 of the protection unit 114 after the alternating current voltage flowed the third resistor R3.

The protection unit 114 receives the reference voltage and the feedback signal. The protection unit 114 comprises the comparator 132. Wherein, the comparator 132 has a first input terminal, a second input terminal and an output terminal. The first input terminal of the comparator 132 is electrically coupled to the second terminal of the third resistor R3 of the feedback unit 116 for receiving the feedback signal. The comparator 132 compares the reference voltage with the feedback signal for outputting a comparing signal to the base terminal of the second transistor 136 of the switch unit 112 according to a comparing result. One of ordinary skill in the art should know that the reference voltage can be supplied by a reference voltage source and the reference voltage is equal to the reference voltage as above-mentioned.

Please prefer to FIG. 3B, the switch unit 112 receives the comparing signal delivered form the protection unit 114. The switch unit 112 comprises a first transistor 138, a first resistor R1, a second resistor R2 and a second transistor 136. The first transistor 138 has a drain terminal, a gate terminal and a source terminal. The drain terminal of the first transistor 138 is electrically coupled to the light source 108. The source terminal of the first transistor 138 is electrically coupled to the alternating current voltage source 102 (through rectifier 104).

The second transistor 136 has an emitter terminal, a base terminal and a collector terminal. The emitter terminal of the second transistor 136 is electrically coupled to ground. The collector of the second transistor 136 is electrically coupled to the gate terminal of the first transistor 138 (through the second resistor R2). Wherein, the second transistor 136 determines turn-on or turn-off according to the comparing signal.

In the present invention, the first resistor R1 has a first terminal and a second terminal. The first terminal of the first resistor R1 is electrically coupled to the gate terminal of the first transistor 138. The second terminal of the first resistor R1 is electrically coupled to the source terminal of the first transistor 138. The second resistor R2 has a first terminal and a second terminal. The first terminal of the second resistor R2 is electrically coupled to the gate terminal of the first transistor 138. The second terminal of the second resistor R2 is electrically coupled to the collector terminal of the second transistor 136.

Wherein, the first transistor 138 determines turn-on or turn-off according to a potential of the collector terminal of the second transistor 136.

Figure 5A:
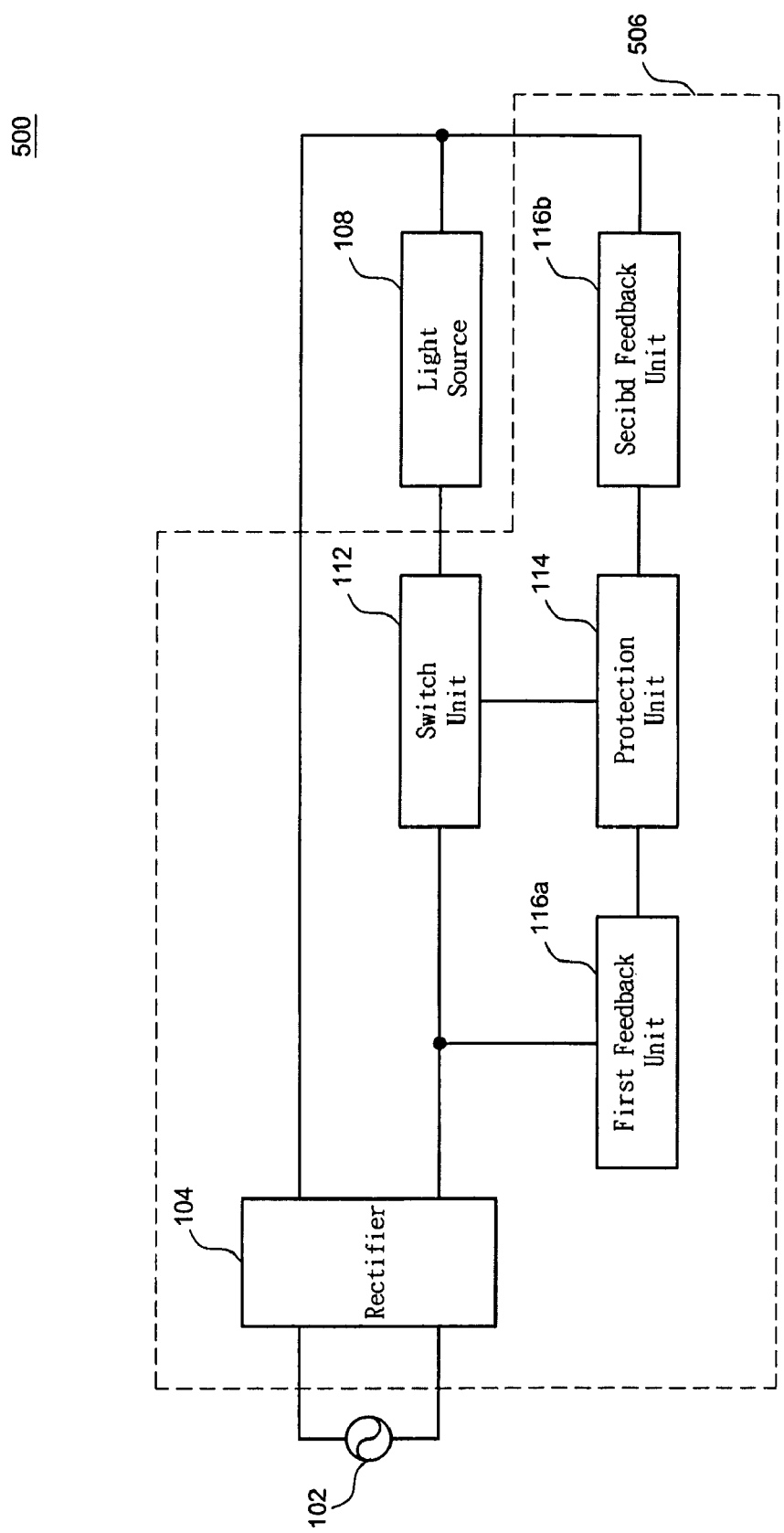
FIG. 5A is a schematic block diagram showing a part of the lighting system according to another embodiment of the present invention.

Please prefer to FIG. 5A, it is a schematic block diagram showing a part of the lighting system according to another embodiment of the present invention. The lighting system 500 comprises a light emitting diode driving device 506 and a light source 108. The light source 108 is similar to the light source described above so that no more will be described here.

The light emitting diode driving device 506 is electrically coupled to an alternating current voltage source 102 and a light source 108. The light emitting diode driving device 506 comprises a rectifier 104, a first feedback unit 106a, a second feedback unit 106b, a switch unit 112 and a protection unit 114.

In the present invention, the rectifier 104 is electrically coupled to the alternating current voltage source 102 and the light source 108 for supplying the alternating current voltage to the light source 108.

The first feedback unit 116a is electrically coupled to the rectifier 104 for detecting the alternating current voltage outputted by the rectifier 104, generating a first feedback signal according to the alternating current voltage and outputting the first feedback signal. The second feedback unit 116b is electrically coupled to the light source 108 for detecting a loading state of the light source 108 and generating a second feedback signal according to the loading state of the light source 108. Then, the second feedback unit 116b outputs the second feedback signal.

The protection unit 114 is electrically coupled to the first feedback unit 116a and the second feedback unit 116b for receiving the first feedback signal and the second feedback signal. The first feedback unit 116a compares the first feedback signal with a first reference voltage built in the protection unit 114 and compares the second feedback signal with a second reference voltage built in the protection unit 114 for outputting a switch signal selectively.

The switch unit 112 has a first terminal, a second terminal and a third terminal. The first terminal of the switch unit 112 is electrically coupled to the alternating current voltage source 102 (through the rectifier 104). The second terminal of the switch unit 112 is electrically coupled to the light source 108. The third terminal of the switch unit 112 is electrically coupled to the protection unit 114 for receiving the switch signal. Then, the switch unit 112 connects or disconnects (through the rectifier 104) between the alternating current voltage source 102 and the light source 108.

Figure 5B:
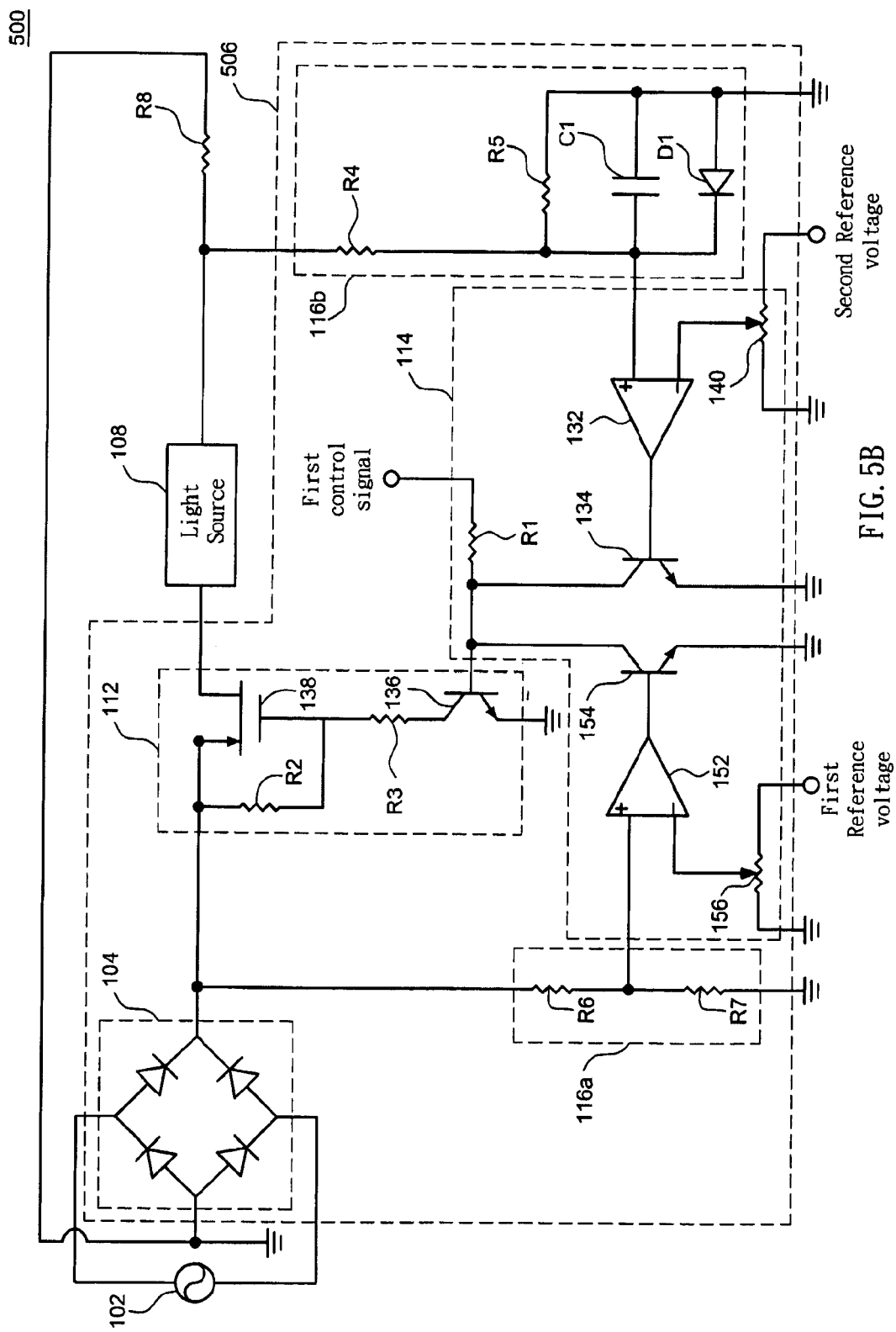
FIG. 5B is a detail circuit showing a part of the lighting system according to another embodiment of the present invention.

Please prefer to FIG. 5B, it is a detail circuit showing a part of the lighting system according to another embodiment of the present invention. The protection unit 114 receives a first and second reference voltage, a first and second feedback signal and a first control signal.

In the present invention, compositions and functions of the second feedback unit 116b and the switch unit 112 are similar to the feedback unit 116 and the switch unit 112 described above. Therefore, no more will be described here.

The protection unit 114 comprises a second comparator 132, a first resistor R1, a first transistor 134, a first comparator 152 and a second transistor 154. The second comparator 132 has a first input terminal, a second input terminal and an output terminal. The first input terminal of the second comparator 132 is electrically coupled to the second feedback unit 116b for receiving the second feedback signal. The second input terminal of the second comparator 132 receives the second reference voltage. Wherein, a variable resistor 140 is further disposed between the second input terminal of the second comparator 132 and a source of the second reference voltage. Therefore, a value inputted to second input terminal of the second comparator 132 can be adjusted according to resistance value of the variable resistor 140. Wherein, the second comparator 132 compares the second reference voltage with the second feedback signal for outputting a second comparing signal.

The first resistor R1 has a first terminal and a second terminal. The first terminal of the first resistor R1 receives the first control signal. The second terminal of the first resistor R1 is electrically coupled to the collector terminal of the first transistor 134. Wherein, the first control signal can be the operating voltage or control signal (if the lighting system has the control unit). The present invention, however, is not limited thereto.

The first transistor 134 has an emitter terminal, a base terminal and a collector terminal. The base terminal of the first transistor 134 is electrically coupled to the output terminal of the second comparator 132 for receiving the second comparing signal. The emitter terminal of the first transistor 134 is electrically coupled to ground. The first transistor 134 determines turn-on or turn-off according to a potential of the second comparing signal.

The first comparator 152 has a first input terminal, a second input terminal and an output terminal. The first input terminal of the first comparator 152 is electrically coupled to the first feedback unit 166a for receiving the first feedback signal. The second input terminal of the first comparator 152 receives the first reference voltage. Wherein, a variable resistor 156 is further disposed between the second input terminal of the first comparator 152 and a source of the first reference voltage. Therefore, a value inputted to second input terminal of the first comparator 152 can be adjusted according to resistance value of the variable resistor 156. Wherein, the first comparator 152 compares the second reference voltage with the second feedback signal for outputting a first comparing signal.

The second transistor 154 has an emitter terminal, a base terminal and a collector terminal. The emitter terminal of the second transistor 154 is electrically coupled to ground. The base terminal of the second transistor 154 is electrically coupled to the output terminal of the first comparator 152. The collector terminal of the second transistor 154 is electrically coupled to the second terminal of the first resistor R1. The first comparator 152 compares the first reference voltage with the first feedback signal for outputting a first comparing signal.

In the present invention, the first feedback unit 116a has a sixth resistor R6 and a seventh resistor R7. Wherein, the sixth resistor R6 has a first terminal and a second terminal. The first terminal of the sixth resistor R6 is electrically coupled to the source terminal of the third transistor 138. The second terminal of the sixth resistor R6 is electrically coupled to the first input terminal of the first comparator 152. The seventh resistor R7 has a first terminal and a second terminal. The first terminal of the seventh resistor R7 is electrically coupled to the second terminal of the sixth resistor R6. The second terminal of the seventh resistor R7 is electrically coupled to ground.

Please prefer to FIG. 5B, the operation method of the lighting system 500 is that the second transistor 154 will be turned on by the first comparing signal outputted by the first comparator 152 if the alternating current voltage outputted by the rectifier 104 is too large. Therefore, a potential of the second terminal of the first resistor R1 is low voltage if the second transistor 154 is turned on. In the same way, if the second feedback unit 116b detects the feedback voltage of the light source 108 is too large, the first transistor 134 will be turned on by the first comparing signal outputted by the second comparator 132. Therefore, a potential of the second terminal of the first resistor R1 is low voltage if the first transistor 134 is turned on.

Secondly, the fourth transistor 136 will not be turned on if a potential of the second terminal of the first resistor R1 is low voltage so that the third transistor 138 will not be turned on. Therefore, the alternating current voltage outputted by the rectifier 104 will not be supplied to the light source 108. The lighting system 500 can be protected by opening the switch unit 112 when the alternating current voltage outputted by the rectifier 104 if the feedback voltage of the light source 108 is too large.

In an embodiment of the present invention, the third transistor 138 can be a P-type semiconductor. The present invention, however, is not limited thereto.

In an embodiment of the present invention, the lighting system 100, 200, 300, and 500 can be a lighting system or a backlight of the display device. The present invention, however, is not limited thereto.

Accordingly, in the driving device and the lighting system of the present invention, the connection can be disconnected by the switch unit when the current value of the light source or the alternating current voltage outputted by the rectifier is too large to avoid a burnout due to an exceeding current of the light source. Therefore, the driving device and the lighting system of the present invention can adjust the illumination value and protect the light source.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

The invention claimed is:

1. A light emitting diode driving device, the light emitting diode driving device is electrically coupled to an alternating current voltage source and a light source, wherein the alternating current voltage source outputs an alternating current voltage, the light emitting diode driving device comprising:

a rectifier electrically coupled to the alternating current voltage source and the light source to supply the alternating current voltage to the light source;

a feedback unit electrically coupled to the light source to detect a loading state of the light source for generating a feedback signal according to the loading state;

a protection unit electrically coupled to the feedback unit to receive the feedback signal for comparing the feedback signal with a reference voltage built in the protection unit and outputting a switch signal;

a switch unit having a first terminal, a second terminal and a third terminal, wherein the first terminal of the switch unit is electrically coupled to the alternating current voltage source, the second terminal of the switch unit is electrically coupled to the light source, and the third terminal of the switch unit is electrically coupled to the protection unit for receiving the switch signal to connect or disconnect between the alternating current voltage source and the light source according to the switch signal;

a timing unit electrically coupled to the alternating current voltage source to fetch the alternating current voltage and perform a synchronous operation with the alternating current voltage for outputting a timing synchronous signal; and a control unit electrically coupled to the timing unit and the protection unit to receive the timing synchronous signal and perform a modulation operation with the timing synchronous signal for outputting a timing modulation signal.

2. The light emitting diode driving device of claim 1, wherein the switch unit receives the timing modulation signal and performs a pulse width modulation with the alternating current voltage according to the timing modulation signal.

3. The light emitting diode driving device of claim 1, wherein the protection unit receives a reference voltage and the feedback signal, the protection unit comprising:

a comparator having a first input terminal, a second input terminal and an output terminal, wherein the first input terminal of the comparator is electrically coupled to the feedback unit for receiving the feedback signal, and the second input terminal of the comparator to receive the reference voltage;

a first resistor having a first terminal and a second terminal, the first terminal of the first resistor to receive a first control signal; and a first transistor having an emitter terminal, a base terminal and a collector terminal, wherein the collector terminal of the first transistor is electrically coupled to the second terminal of the first resistor, the base terminal of the first transistor is electrically coupled to the output terminal of the comparator, and the emitter terminal of the first transistor is electrically coupled to ground.

4. The light emitting diode driving device of claim 3, wherein the comparator compares the reference voltage with the feedback signal for outputting a comparing signal.

5. The light emitting diode driving device of claim 4, wherein the first transistor determines turn-on or turn-off according to the comparing signal.

6. The light emitting diode driving device of claim 3, wherein the first control signal is the timing modulation signal.

7. The light emitting diode driving device of claim 3, wherein the protection unit further comprising a variable resistor electrically coupled between the second input terminal of the comparator and a source of the reference voltage.

8. The light emitting diode driving device of claim 3, wherein the switch unit comprising:

a second transistor having a drain terminal, a gate terminal and a source terminal, wherein the drain terminal of the second transistor is electrically coupled to the light source, and the source terminal of the second transistor is electrically coupled to the alternating current voltage source;

a second resistor having a first terminal and a second terminal, wherein the first terminal of the second resistor is electrically coupled to the gate terminal of the second transistor, and the second terminal of the second resistor is electrically coupled to the source terminal of the second transistor;

a third resistor having a first terminal and a second terminal, wherein the first terminal of the third resistor is electrically coupled to the gate terminal of the first transistor; and a third transistor having an emitter terminal, a base terminal and a collector terminal, wherein the collector terminal of the third transistor is electrically coupled to the second terminal of the third resistor, the emitter terminal of the third transistor is electrically coupled to ground, and the base terminal of the third transistor is electrically coupled to the emitter terminal of the first transistor.

9. The light emitting diode driving device of claim 8, wherein the third transistor determines turn-on or turn-off according to a potential of the emitter terminal of the first transistor.

10. The light emitting diode driving device of claim 8, wherein the second transistor determines turn-on or turn-off according to a potential of the first terminal of the third resistor.

11. The light emitting diode driving device of claim 8, the feedback unit comprising:

a fourth resistor having a first terminal and a second terminal, wherein the first terminal of the fourth resistor is electrically coupled to the light source, and the second terminal of the fourth resistor is electrically coupled to the first input terminal of the comparator;

a fifth resistor having a first terminal and second terminal, wherein the first terminal of the fifth resistor is electrically coupled to the second terminal of the fourth resistor, and the second terminal of the fifth resistor is electrically coupled to ground;

a capacitor having a first terminal and a second terminal, wherein the first terminal of the capacitor is electrically coupled to the second terminal of the fourth resistor, and the second terminal of the capacitor is electrically coupled to ground; and a diode having a first terminal and a second terminal, wherein the first terminal of the diode is electrically coupled to the second terminal of the fourth resistor, and the second terminal of the diode is electrically coupled to ground.

12. A light emitting diode driving device, the light emitting diode driving device is electrically coupled to an alternating current voltage source and a light source, wherein the alternating current voltage source outputs an alternating current voltage, the light emitting diode driving device comprising:

a rectifier electrically coupled to the alternating current voltage source and the light source to supply the alternating current voltage to the light source;

a feedback unit electrically coupled to the light source to detect a loading state of the light source for generating a feedback signal according to the loading state;

a protection unit electrically coupled to the feedback unit to receive the feedback signal for comparing the feedback signal with a reference voltage built in the protection unit and outputting a switch signal; and a switch unit having a first terminal, a second terminal and a third terminal, wherein the first terminal of the first terminal of the switch unit is electrically coupled to the alternating current voltage source, the second terminal of the switch unit is electrically coupled to the light source, and the third terminal of the switch unit is electrically coupled to the protection unit for receiving the switch signal to connect or disconnect between the alternating current voltage source and the light source according to the switch signal.

13. The light emitting diode driving device of claim 12, wherein the protection unit receives a reference voltage and the feedback signal and comprises a comparator having a first input terminal, a second input terminal and an output terminal, wherein the first input terminal of the comparator is electrically coupled to the feedback unit for receiving the feedback signal, and the second input terminal of the comparator to receive the reference voltage.

14. The light emitting diode driving device of claim 13, wherein the comparator compares the reference voltage with the feedback signal for outputting a comparing signal.

15. The light emitting diode driving device of claim 14, wherein the switch unit comprising:
    a first transistor having a drain terminal, a gate terminal and a source terminal, wherein the drain terminal of the first transistor is electrically coupled to the light source, and the source terminal of the first transistor is electrically coupled to the alternating current voltage source;
    a first resistor having a first terminal and a second terminal, wherein the first terminal of the first resistor is electrically coupled to the gate terminal of the first transistor, and the second terminal of the first resistor is electrically coupled to the source terminal of the first transistor;
    a second resistor having a first terminal and a second terminal, wherein the first terminal of the second resistor is electrically coupled to the gate terminal of the first transistor; and
    a second transistor having an emitter terminal, a base terminal and a collector terminal, wherein the collector terminal of the second transistor is electrically coupled to the second terminal of the second resistor, the emitter terminal of the second transistor is electrically coupled to ground, and the base terminal of the second transistor is electrically coupled to the output terminal of the comparator.

16. The light emitting diode driving device of claim 15, wherein the second transistor determines turn-on or turn-off according to the comparing signal outputted by the comparator.

17. The light emitting diode driving device of claim 15, wherein the first transistor determines turn-on or turn-off according to a potential of the first terminal of the second resistor.

18. The light emitting diode driving device of claim 15, wherein the feedback unit comprising:
    a third resistor having a first terminal and a second terminal, wherein the first terminal of the third resistor is electrically coupled to the light source, and the second terminal of the third resistor is electrically coupled to the first input terminal of the comparator;
    a fourth resistor having a first terminal and a second terminal, wherein the first terminal of the fourth resistor is electrically coupled to the second terminal of the third resistor, and the second terminal of the fourth resistor is electrically coupled to ground;
    a capacitor having a first terminal and a second terminal, wherein the first terminal of the capacitor is electrically coupled to the second terminal of the third resistor, and the second terminal of the capacitor is electrically coupled to ground; and
    a diode having a first terminal and a second terminal, wherein the first terminal of the diode is electrically coupled to the second terminal of the third resistor, and the second terminal of the diode is electrically coupled to ground.

19. The light emitting diode driving device of claim 12, wherein the light source comprises a light emitting diode which can be driven by direct voltage or alternating current voltage.

20. A light emitting diode driving device, the light emitting diode driving device is electrically coupled to an alternating current voltage source and a light source, wherein the alternating current voltage source outputs an alternating current voltage, the light emitting diode driving device comprising:
    a rectifier electrically coupled to the alternating current voltage source and the light source to supply the alternating current voltage to the light source;
    a feedback unit electrically coupled to the light source to detect a loading state of the light source for generating a feedback signal according to the loading state;
    a control unit electrically coupled to the feedback unit to receive and output the feedback signal, and the control unit to compare the feedback signal with a predetermined illumination for generating a first comparing result;
    a protection unit electrically coupled to the control unit to receive the feedback signal and the first comparing result, the protection unit to compare the feedback signal with a reference voltage for generating a second comparing result, the protection unit to generate and output a switch signal according to the first and second comparing result; and
    a switch unit having a first terminal, a second terminal and a third terminal, wherein the first terminal of the switch unit is electrically coupled to the alternating current voltage source, the second terminal of the switch unit is electrically coupled to the light source, and the third terminal of the switch unit is electrically coupled to the protection unit for receiving the switch signal to connect or disconnect between the alternating current voltage source and the light source according to the switch signal.

21. The light emitting diode driving device of claim 20, further comprising a timing unit electrically coupled to the alternating current voltage source for fetching the alternating current voltage and performing a synchronous operation with the alternating current voltage to output a timing synchronous signal.

22. The light emitting diode driving device of claim 21, wherein the control unit receives the timing synchronous signal and performs a modulation operation with the timing synchronous signal for outputting a timing modulation signal.

23. The light emitting diode driving device of claim 22, wherein the switch unit receives the timing modulation signal and performs a pulse width modulation with the alternating current voltage according to the timing modulation signal.

24. The light emitting diode driving device of claim 23, wherein the light source comprising at least a light emitting diode which can be driven by direct voltage or alternating current voltage.

25. A lighting system, the lighting system is electrically coupled to an alternating current voltage source, wherein the alternating current voltage source outputs an alternating current voltage, the lighting system comprising:
- a light source electrically coupled to the alternating current voltage source to receive the alternating current voltage; and
- a light emitting diode driving device electrically coupled to the alternating current voltage source and the light source, the light emitting diode driving device comprising:
  - a rectifier electrically coupled to the alternating current voltage source and the light source to supply the alternating current voltage to the light source;
  - a feedback unit electrically coupled to the light source to detect a loading state of the light source for generating a feedback signal according to the loading state;
  - a protection unit electrically coupled to the feedback unit to receive the feedback signal for comparing the feedback signal with a reference voltage built in the protection unit and outputting a switch signal; and
  - a switch unit having a first terminal, a second terminal and a third terminal, wherein the first terminal of the switch unit is electrically coupled to the alternating current voltage source, the second terminal of the switch unit is electrically coupled to the light source, and the third terminal of the switch unit is electrically coupled to the protection unit for receiving the switch signal to connect or disconnect between the alternating current voltage source and the light source according to the switch signal.

26. The lighting system of claim 25, wherein the protection unit receives a reference voltage and the feedback signal and comprises a comparator having first input terminal, a second input terminal and an output terminal, wherein the first input terminal of the comparator is electrically coupled to the feedback unit for receiving the feedback signal, and the second input terminal of the comparator receives the reference voltage.

27. The lighting system of claim 26, wherein the comparator compares the reference voltage with the feedback signal for outputting a comparing signal.

28. The lighting system of claim 25, wherein the light source comprises at least a light emitting diode which can be driven by direct voltage or alternating current voltage.

29. A light emitting diode driving device, the light emitting diode driving device is electrically coupled to an alternating current voltage source and a light source, wherein the alternating current voltage source outputs an alternating current voltage, the light emitting diode driving device comprising:
- a rectifier electrically coupled to the alternating current voltage source and the light source to supply the alternating current voltage to the light source;
- a first feedback unit electrically coupled to the rectifier to detect the alternating current voltage outputted by the rectifier for generating a first feedback signal according to the alternating current voltage;
- a second feedback unit electrically coupled to the light source to detect a loading state of the light source for generating a second feedback signal according to the loading state and outputting the second feedback signal;
- a protection unit electrically coupled to the first feedback unit and the second feedback unit to receive the first feedback signal and the second feedback signal for comparing the first feedback signal with a first reference voltage built in the protection unit, and comparing the second feedback signal with second reference voltage built in the protection unit to output a switch signal selectively; and
- a switch unit having a first terminal, a second terminal and a third terminal, wherein the first terminal of the switch unit is electrically coupled to the alternating current voltage source, the second terminal of the switch unit is electrically coupled to the light source, and the third terminal of the switch unit is electrically coupled to the protection unit for receiving the switch signal to connect or disconnect between the alternating current voltage source and the light source according to the switch signal.

30. The light emitting diode driving device of claim 29, wherein the protection unit receives the first and second reference voltage, the first and second feedback signal and a first control signal, and the protection unit comprising:
- a first comparator having a first input terminal, a second input terminal and an output terminal, wherein the first input terminal of the first comparator is electrically coupled to the first feedback unit for receiving the first feedback signal, and the second input terminal of the first comparator to receive the first reference voltage;
- a second comparator having a first input terminal, a second input terminal and an output terminal, wherein the first input terminal of the second comparator is electrically coupled to the second feedback unit for receiving the second feedback signal, and the second input terminal of the second comparator to receive the second reference voltage;
- a first resistor having a first terminal and a second terminal, the first terminal of the first resistor to receive a first control signal;
- a first transistor having an emitter terminal, a base terminal and collector terminal, wherein the collector terminal of the first transistor is electrically coupled to the second terminal of the first resistor, the base terminal of the first transistor is electrically coupled to the output terminal of the first comparator, and the emitter terminal of the first transistor is electrically coupled to ground; and
- a second transistor having emitter terminal, a base terminal and a collector terminal, wherein the emitter terminal of the second transistor is electrically coupled to ground, the base terminal of the second transistor is electrically coupled to the output terminal of the first comparator, and the collector terminal of the second transistor is electrically coupled to the second terminal of the first resistor.

31. The light emitting diode driving device of claim 30, wherein the first comparator compares the first reference voltage with the first feedback signal for outputting a first comparing signal selectively.

32. The light emitting diode driving device of claim 30, wherein the second comparator compares the second reference voltage with the second feedback signal for outputting a second comparing signal selectively.

33. The light emitting diode driving device of claim 30, wherein the switch unit comprising:
- a third transistor having a drain terminal, a gate terminal and a source terminal, wherein the drain terminal of the third transistor is electrically coupled to the light source, and the source terminal of the third transistor is electrically coupled to the rectifier;
- a second resistor having a first terminal and a second terminal, wherein the first terminal of the second resistor is electrically coupled to the gate terminal of the third transistor, and the second terminal of the second resistor is electrically coupled to the source terminal of the third transistor;

a third resistor having a first terminal and a second terminal, wherein the first terminal of the third resistor is electrically coupled to the gate terminal of the third transistor; and a fourth transistor having an emitter terminal, a base terminal and a collector terminal, wherein the collector terminal of the fourth transistor is electrically coupled to the second terminal of the third resistor, the emitter terminal of the fourth transistor is electrically coupled to ground, and the base terminal of the fourth transistor is electrically coupled to the second terminal of the first resistor.

34. The light emitting diode driving device of claim 33, wherein the fourth transistor determines turn-on or turn-off according to a potential of the second terminal of the first resistor.

35. The light emitting diode driving device of claim 33, wherein the third transistor determines turn-on or turn-off according to a potential of the first terminal of the third resistor.

36. The light emitting diode driving device of claim 33, wherein the first feedback unit comprising:

an sixth resistor having a first terminal and a second terminal, wherein the first terminal of the sixth resistor is electrically coupled to the source terminal of the third transistor, and the second terminal of the sixth resistor is electrically coupled to the first input terminal of the first comparator; and an seventh resistor having a first terminal and a second terminal, wherein the first terminal of the seventh resistor is electrically coupled to the second terminal of the sixth resistor, and the second terminal of the seventh resistor is electrically coupled to ground.

37. The light emitting diode driving device of claim 30, wherein the second feedback unit comprising:

a fourth resistor having a first terminal and a second terminal, wherein the first terminal of the fourth resistor is electrically coupled to the light source, and the second terminal of the fourth resistor is electrically coupled to the first input terminal of the second comparator;

a fifth resistor having a first terminal and a second terminal, wherein the first terminal of the fifth resistor is electrically coupled to the second terminal of the fourth resistor, and the second terminal of the fifth resistor is electrically coupled to ground;

a capacitor having a first terminal and a second terminal, wherein the first terminal of the capacitor is electrically coupled to the second terminal of the fourth resistor, and the second terminal of the capacitor is electrically coupled to ground; and a diode having a first terminal and a second terminal, wherein the first terminal of the diode is electrically coupled to the second terminal of the fourth resistor, and the second terminal of the diode is electrically coupled to ground.

38. The light emitting diode driving device of claim 29, wherein the light source comprising at least a light emitting diode which can be driven by direct voltage or alternating current voltage.

39. A lighting system electrically, the lighting system electrically is coupled to an alternating current voltage source, wherein the alternating current voltage source outputs an alternating current voltage, the lighting system comprising:

a light source electrically coupled to the alternating current voltage source to receive the alternating current voltage; and a light emitting diode driving device electrically coupled to the alternating current voltage source and the light source, the light emitting diode driving device comprising:

a rectifier electrically coupled to the alternating current voltage source and the light source to supply the alternating current voltage to the light source;

a first feedback unit electrically coupled to the rectifier to detect the alternating current voltage outputted by the rectifier for generating a first feedback signal according to the alternating current voltage;

a second feedback unit electrically coupled to the light source to detect a loading state of the light source for generating a second feedback signal according to the loading state;

a protection unit electrically coupled to the first feedback unit and the second feedback unit to receive the first feedback signal and the second feedback signal for comparing the first feedback signal with a first reference voltage built in the protection unit, and comparing the second feedback signal with second reference voltage built in the protection unit to output a switch signal selectively; and a switch unit having a first terminal, a second terminal and a third terminal, wherein the first terminal of the switch unit is electrically coupled to the alternating current voltage source, the second terminal of the switch unit is electrically coupled to the light source, and the third terminal of the switch unit is electrically coupled to the protection unit for receiving the switch signal to connect or disconnect between the alternating current voltage source and the light source according to the switch signal.

40. The lighting system of claim 39, wherein the protection unit receives the first and second reference voltage, the first and second feedback signal and a first control signal, and the protection unit comprising:

a first comparator having a first input terminal, a second input terminal and an output terminal, wherein the first input terminal of the first comparator is electrically coupled to the first feedback unit for receiving the first feedback signal, and the second input terminal of the first comparator to receive the first reference voltage;

a second comparator having a first input terminal, a second input terminal and an output terminal, wherein the first input terminal of the second comparator is electrically coupled to the second feedback unit for receiving the second feedback signal, and the second input terminal of the second comparator to receive the second reference voltage;

a first resistor having a first terminal and a second terminal, the first terminal of the first resistor to receive a first control signal;

a first transistor having an emitter terminal, a base terminal and collector terminal, wherein the collector terminal of the first transistor is electrically coupled to the second terminal of the first resistor, the base terminal of the first transistor is electrically coupled to the output terminal of the output terminal of the first comparator, and the emitter terminal of the first transistor is electrically coupled to ground; and a first comparator having a first input terminal, a second input terminal and an output terminal, wherein the first input terminal of the first comparator is electrically coupled to the first feedback unit for receiving the first feedback signal, and the second input terminal of the first comparator receives the first reference voltage; and a second transistor having emitter terminal, a base terminal and a collector terminal, wherein the emitter terminal of the second transistor is electrically coupled to ground, the base terminal of the second transistor is electrically coupled to the output terminal of the first comparator, and the collector terminal of the second transistor is electrically coupled to the second terminal of the first resistor.

41. The lighting system of claim 40, wherein the first comparator compares the first reference voltage with the first feedback signal for outputting a first comparing signal selectively.

42. The lighting system of claim 40, wherein the second comparator compares the second reference voltage with the second feedback signal for outputting a second comparing signal selectively.

43. The lighting system of claim 40, wherein the light emitting diode is driven by direct voltage or alternating current voltage.

* * * * *